US009221227B2

(12) United States Patent
Boldrini et al.

(10) Patent No.: US 9,221,227 B2
(45) Date of Patent: Dec. 29, 2015

(54) METHOD AND MACHINE FOR PRODUCING BAGS CONTAINING FIBER MATERIAL

(71) Applicant: G.D S.p.A, Bologna (IT)

(72) Inventors: Fulvio Boldrini, Ferrara (IT); Roberto Claudio Franco Ghiotti, Calderino di Monte San Pietro (IT)

(73) Assignee: G.D S.P.A. (IT)

(*) Notice: Subject to any disclaimer, the term of this patent is extended or adjusted under 35 U.S.C. 154(b) by 316 days.

(21) Appl. No.: 13/709,203

(22) Filed: Dec. 10, 2012

(65) Prior Publication Data

US 2013/0157829 A1 Jun. 20, 2013

(30) Foreign Application Priority Data

Dec. 16, 2011 (IT) .............................. BO2011A0725

(51) Int. Cl.
*B65H 5/00* (2006.01)
*B31B 1/26* (2006.01)
(Continued)

(52) U.S. Cl.
CPC ... *B31B 1/26* (2013.01); *B65B 1/02* (2013.01); *B65B 1/34* (2013.01); *B65B 29/00* (2013.01);
(Continued)

(58) Field of Classification Search
CPC ........ B65B 29/00; B65B 43/04; B65B 61/06; B65B 2237/40; B65B 2237/406; B65H 20/32; B65H 20/30
USPC ............ 53/545, 558, 562, 570; 226/1, 24, 34, 226/52, 92, 120
See application file for complete search history.

(56) References Cited

U.S. PATENT DOCUMENTS 2,792,615 A * 5/1957 Cohn .................... F26B 13/102 226/26
3,941,290 A * 3/1976 Bunning ................ G01D 15/30 226/83
(Continued)

FOREIGN PATENT DOCUMENTS

CA 1220107 4/1987
DE 202011000147 4/2011
(Continued)

OTHER PUBLICATIONS

Office Action issued by the European Patent Office dated Jan. 14, 2014 for parallel Eurpoean Patent Application No. 12194837.6-1708.
(Continued)

*Primary Examiner* — Stephen F Gerrity
*Assistant Examiner* — Eyamindae Jallow
(74) *Attorney, Agent, or Firm* — Timothy J. Klima; Shuttleworth & Ingersoll, PLC

(57) ABSTRACT

A method for producing bags containing fiber material, comprises the steps of forming at least one continuous layer of fiber material; separating in succession portions of fiber material from the continuous layer and moving them along a predetermined path; feeding each portion of fiber material to respective containment and compaction elements of a first transfer conveyor; feeding an ordered succession of bags containing respective portions of fiber material to respective supporting elements of a second transfer conveyor; transferring the portions of fiber material from the first transfer conveyor inside respective containment bags carried by the second transfer conveyor; transferring the containment bags housing respective portions of fiber material from the respective supporting elements of the second transfer conveyor to a fourth transfer conveyor; and moving in succession the bags housing respective portions of fiber material to a folding unit at which the bags are closed.

2 Claims, 12 Drawing Sheets

(51) Int. Cl.

| | |
|---|---|
| ***B65H 20/32*** | (2006.01) |
| ***B65B 29/00*** | (2006.01) |
| ***B65B 37/00*** | (2006.01) |
| ***B65B 37/16*** | (2006.01) |
| ***B65B 39/06*** | (2006.01) |
| ***B65B 63/02*** | (2006.01) |
| ***B65B 1/02*** | (2006.01) |
| ***B65B 1/34*** | (2006.01) |

(52) U.S. Cl.
CPC ................. *B65B 37/00* (2013.01); *B65B 37/16* (2013.01); *B65B 39/06* (2013.01); *B65B 63/02* (2013.01); *B65H 20/32* (2013.01)

(56) References Cited

U.S. PATENT DOCUMENTS

| | | | | |
|---|---|---|---|---|
| 4,723,394 | A * | 2/1988 | Focke et al. | 53/562 |
| 5,174,088 | A * | 12/1992 | Focke et al. | 53/431 |
| 5,425,215 | A * | 6/1995 | Lewis et al. | 53/170 |
| 5,509,256 | A * | 4/1996 | Groth | 53/513 |
| 6,044,624 | A * | 4/2000 | Focke et al. | 53/438 |
| 6,212,859 | B1 * | 4/2001 | Bielik et al. | 53/455 |
| 6,751,926 | B1 * | 6/2004 | Cooper | 53/79 |
| 7,937,916 | B2 | 5/2011 | Thierig et al. | |
| 7,952,037 | B2 | 5/2011 | Jacobi et al. | |
| 8,074,428 | B2 * | 12/2011 | Hoppe et al. | 53/438 |
| 2009/0193757 | A1 * | 8/2009 | Roesler | 53/138.1 |
| 2009/0193762 | A1 | 8/2009 | Thierig et al. | |
| 2011/0192878 | A1 * | 8/2011 | Teranishi | B32B 17/064 226/1 |
| 2012/0228353 | A1 * | 9/2012 | Fresnel | B65H 20/24 226/1 |
| 2013/0214023 | A1 * | 8/2013 | de Jong | B41J 11/42 226/1 |

FOREIGN PATENT DOCUMENTS

| | | |
|---|---|---|
| EP | 1454852 | 9/2004 |
| EP | 1992924 | 11/2008 |
| EP | 2087993 | 8/2009 |
| EP | 2230067 | 9/2010 |

OTHER PUBLICATIONS

Italian Search Report dated Apr. 19, 2012 for counterpart Italian patent application.

* cited by examiner

METHOD AND MACHINE FOR PRODUCING BAGS CONTAINING FIBER MATERIAL

This application claims priority to Italian Patent Application BO2011A000725 filed Dec. 16, 2011, the entirety of which is incorporated by reference herein.

BACKGROUND OF THE INVENTION

This invention relates to a method and a machine for producing bags containing fiber material, preferably loose tobacco.

This specification refers, without limiting the scope of the invention, to a machine for forming portions of loose tobacco, preferably of the type known as rolling tobacco, and filling it into bags.

The production of bags containing tobacco, used by pipe smokers or cigarette smokers who make their own cigarettes by rolling the tobacco in a piece of gummed paper, is usually implemented on machines of the type described, for example, in patent EP14548521B1, in which the portions of tobacco are placed in the bags without performing truly effective constant checks on quantity and position.

In effect, machines for producing bags containing tobacco are known which comprise metering units capable of separating and weighing single tobacco portions to be placed in bags.

These machines extend substantially vertically from a top section where there is a unit for feeding loose tobacco, to a base section where a collecting unit receives and conveys the single portions to a packaging station downstream.

More precisely, prior art machines comprise a unit for forming a continuous strand of loose tobacco extending along vertical duct from a hopper, which contains the tobacco, to a cutting device.

The device which cuts the continuous strand of tobacco is located at an outfeed section of the duct and divides the continuous strand into a succession of single tobacco portions.

Under the outfeed section, there is a primary drum having three angularly equispaced receptacles each designed to be aligned in turn with the outfeed mouth as the primary drum rotates about its axis of rotation.

Thus, once the cutting device has formed a single portion, that portion falls by gravity into the receptacle below it.

Also associated with the primary drum is a scale for measuring the weight of the tobacco portion after it has been cut.

The machines concerned cut the strand of tobacco in such a way as to obtain tobacco portions which are underweight compared to a preset weight required for subsequent packaging.

At the sides of the primary drum, in an underlying zone, there are two secondary drums, which are identical to the primary drum and into whose receptacles the primary drum itself releases the single portions after weighing them.

More precisely, the primary drum is moved reciprocatingly so as to release a portion to one of the secondary drums and then to the other alternately, thereby increasing the productivity of the machine.

Since the portion that is dropped into the secondary drum is underweight, the secondary drum itself is made to face an auxiliary compensating duct which adds tobacco to each portion in order to reach the required target weight.

The auxiliary duct leads out of the hopper, from which it draws the tobacco needed for compensation, and is made up of a succession of channels and rollers for transporting the tobacco.

The channels and rollers are functionally connected to the scale of the primary drum in order to convey to the secondary drum the quantity of tobacco to be added in order to reach the target weight.

Weight compensation is performed by allowing the tobacco to drop by gravity from an upper position, that is, from the outlet of the auxiliary duct, to a lower position, that is, the receptacle of the secondary drum.

Under each of the secondary drums there is a conveyor belt which mounts a succession of buckets moved by the conveyor itself.

The buckets are positioned one after the other under the secondary drums which, as they turn, allow each portion of tobacco to drop into a respective bucket.

By way of example, patent publications CA1220107 and EP1992924 describe machines for forming and individually transporting tobacco portions of the type described above.

The productivity of the prior art devices described above is low because the tobacco is gravity fed numerous times along its transportation path. Indeed, gravity feed constitutes a physical limitation which makes it impossible to increase production speed.

Moreover, the system by which the weight of the tobacco portions is checked and compensated is unsatisfactory because weight checking and compensation cannot be carried out until after the tobacco portions have been cut from the continuous strand of loose tobacco.

SUMMARY OF THE INVENTION

This invention has for an aim to provide a method and a machine for producing bags containing tobacco and which overcome the above mentioned disadvantages.

According to the invention, a method and a machine for producing bags containing tobacco as described in the appended claims are provided.

BRIEF DESCRIPTION OF THE DRAWINGS

The invention is described below with reference to the accompanying drawings, which illustrate two non-limiting embodiments of it, and in which.

DESCRIPTION OF THE PREFERRED EMBODIMENTS

Figure 1:
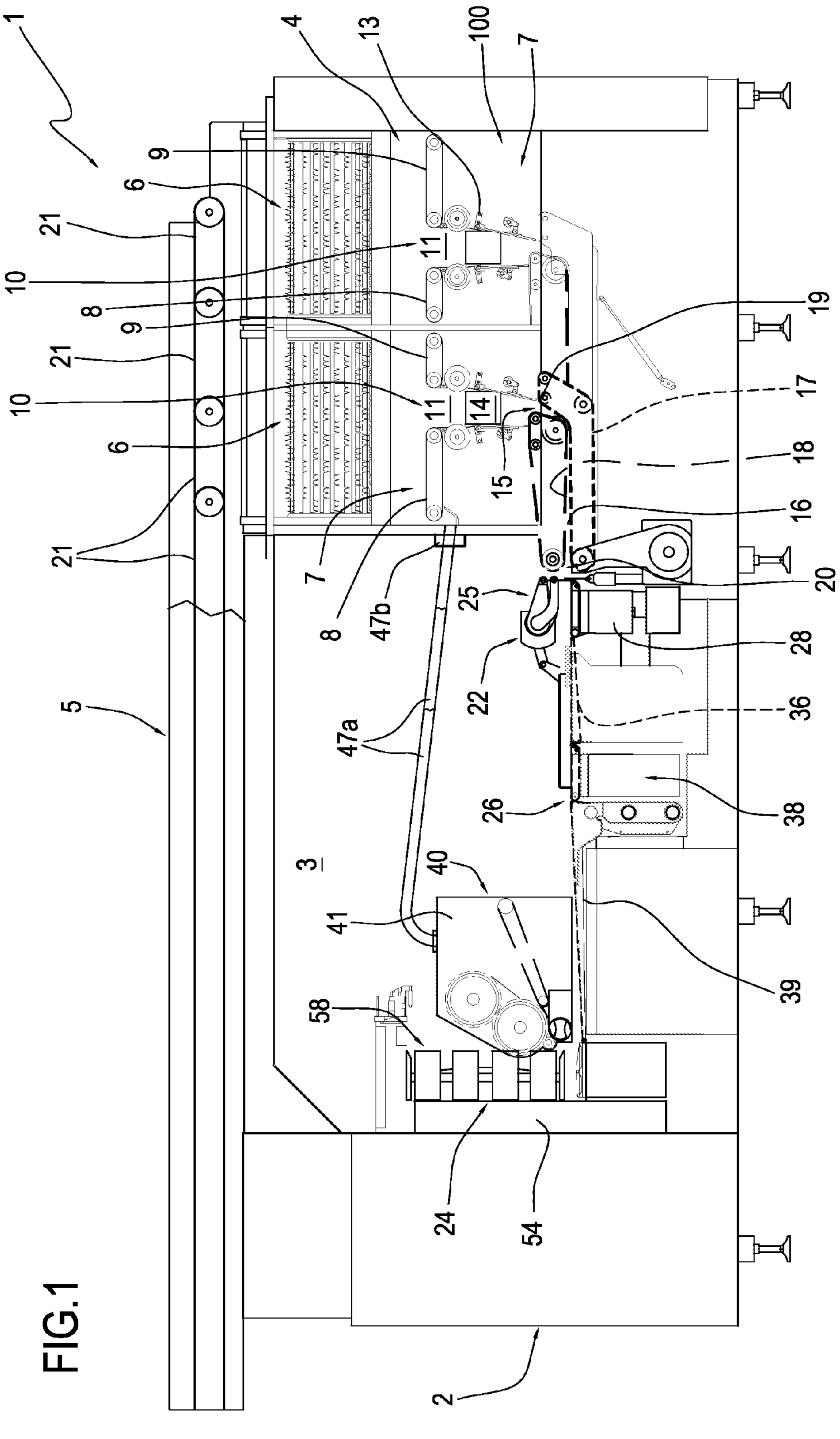
FIG. 1 is a front view of a machine for producing bags containing tobacco according to the invention.

The numeral 1 in FIG. 1 denotes in its entirety a machine for producing bags or packages 64 containing tobacco or similar fiber material.

The machine 1 comprises a base 2, a front part of which is defined by a vertical wall 3.

A portion of the wall 3, on the right-hand side in FIG. 1, mounts a tobacco portioning section, labeled 100 as a whole. The portioning section 100 includes a tobacco feed unit 4 which receives the tobacco from a tobacco delivery unit 5 above it, mounted on an upper portion of the base 2.

The tobacco feed unit 4 comprises two identical feed devices 6 placed side by side on the left- and right-hand sides of FIG. 1, of per se known type and each being designed to carry the tobacco towards a dispensing section 7 underneath. The feed devices 6 and the respective dispensing sections 7 underneath are located side by side relative to a vertical reference plane parallel to the wall 3. Further, the feed devices 6, together with the respective dispensing sections 7 underneath them, are horizontally offset from each other by a stretch of defined length along a direction perpendicular to the vertical reference plane.

Each dispensing section 7 comprises two conveyor belts 8 and 9, on the left- and right-hand sides in FIG. 1, having respective horizontal, co-planar conveying sections. The conveyor belts 8 and 9 are designed to convey the tobacco received from the feed devices 6 above them in a horizontal direction parallel to the wall 3, and the conveyor belts 8 and 9 of each pair are spaced from each other by a stretch of defined length to form a passage 10 between them. Under each passage 10 there is a tobacco duct 11 extending downwardly in a substantially vertical direction and having two flanks perpendicular to the wall 3 and defined by respective substantially vertical side walls 12. The side walls 12 are connected to vibrating devices 13 capable of imparting vibratory motion to the side walls 12 to facilitate the downward motion of the tobacco between them. Along the duct 11, under the conveyor belts 8 and 9, there is a detecting device 14 of per se known type for detecting the level of the tobacco in the duct 11 itself and to regulate in a per se known manner the flow of tobacco conveyed towards the feed devices 6 and leaving the dispensing sections 7.

The feed devices 6 and the underlying dispensing section 7, on the left in FIG. 1, are located further from the wall 3 than the feed devices 6 and the underlying dispensing section 7 situated on the right, so that the lower ends of the respective ducts 11 are also respectively further from and closer to the wall 3.

Figure 5:
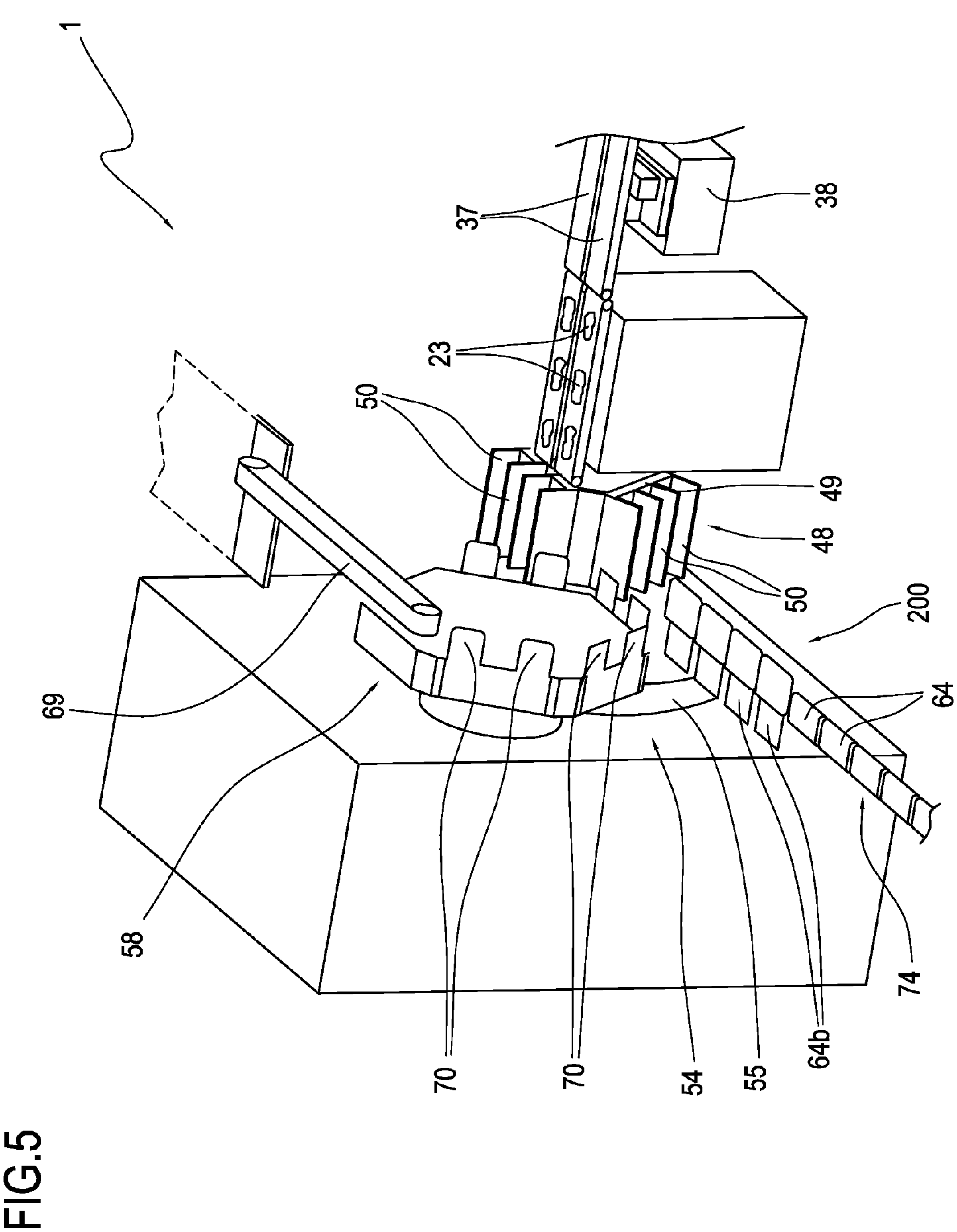
FIG. 5 is an axonometric view of a part of the machine of FIG. 1.
Figure 11:
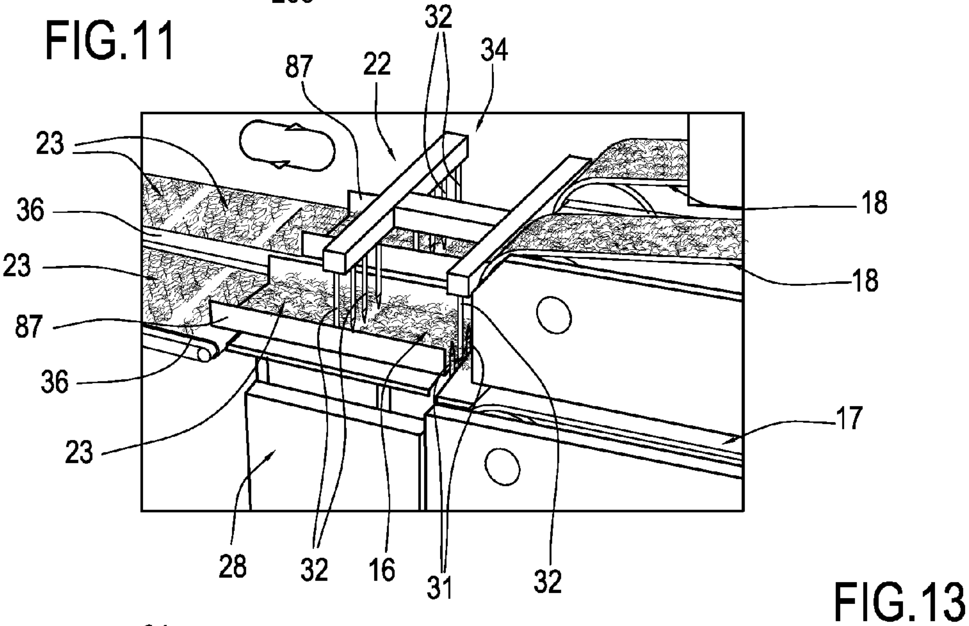
FIG. 11 is a perspective view of certain details of a variant of the machine of FIGS. 1-10.

Located under the lower end of each of the ducts 11 is the inlet 19 of a passage 15, hereinafter also referred to as "duct for forming a layer or strand 16 of tobacco", which is defined at the bottom by the right-hand end of a conveyor belt 17 running left, having a straight, substantially horizontal upper conveying section and extending parallel to the wall 3. The passage 15 is defined at the top by the straight, substantially horizontal lower conveying section of a conveyor belt 18, running left like the conveyor belt 17 and also extending parallel to the wall 3. That means each of the two ducts or passages 15 extends away from the respective duct 11 in a direction A1 for forming the layer 16 from its initial section or inlet 19 to its end section or outlet 20, and during transit within the ducts or passages 15 the tobacco layer 16 undergoes slight compression. It should be noted that the tobacco layers 16 leading out of the dispensing sections 7, (as shown in FIGS. 5 and 11) are parallel to each other and are spaced differently from the aforementioned reference plane. Based on the above, the belts 17 and 18 will hereinafter be referred to in their entirety as "apparatus for forming" the tobacco layer 16.

Figure 1A:
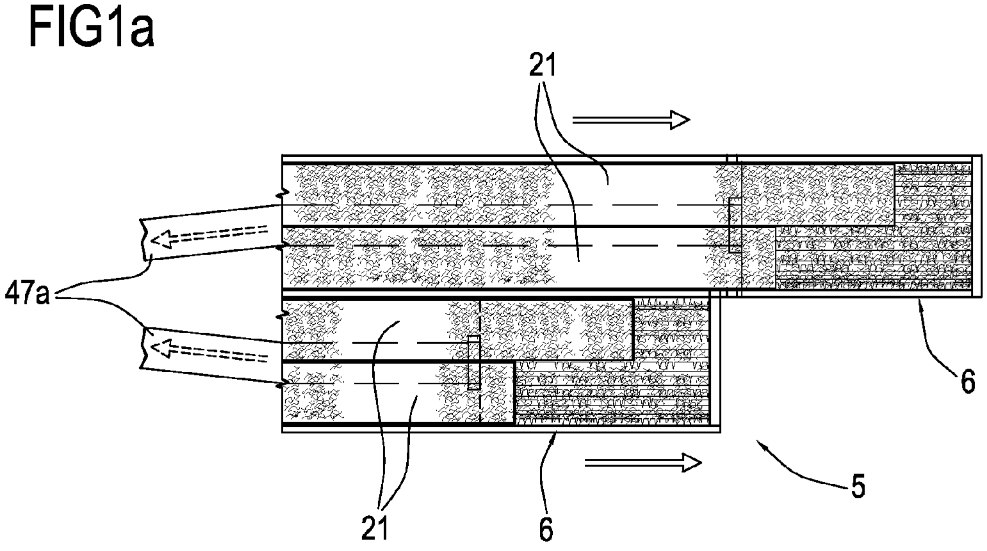
FIG. 1*a* is a plan view of certain details of the machine of FIG. 1.
Figure 1B:
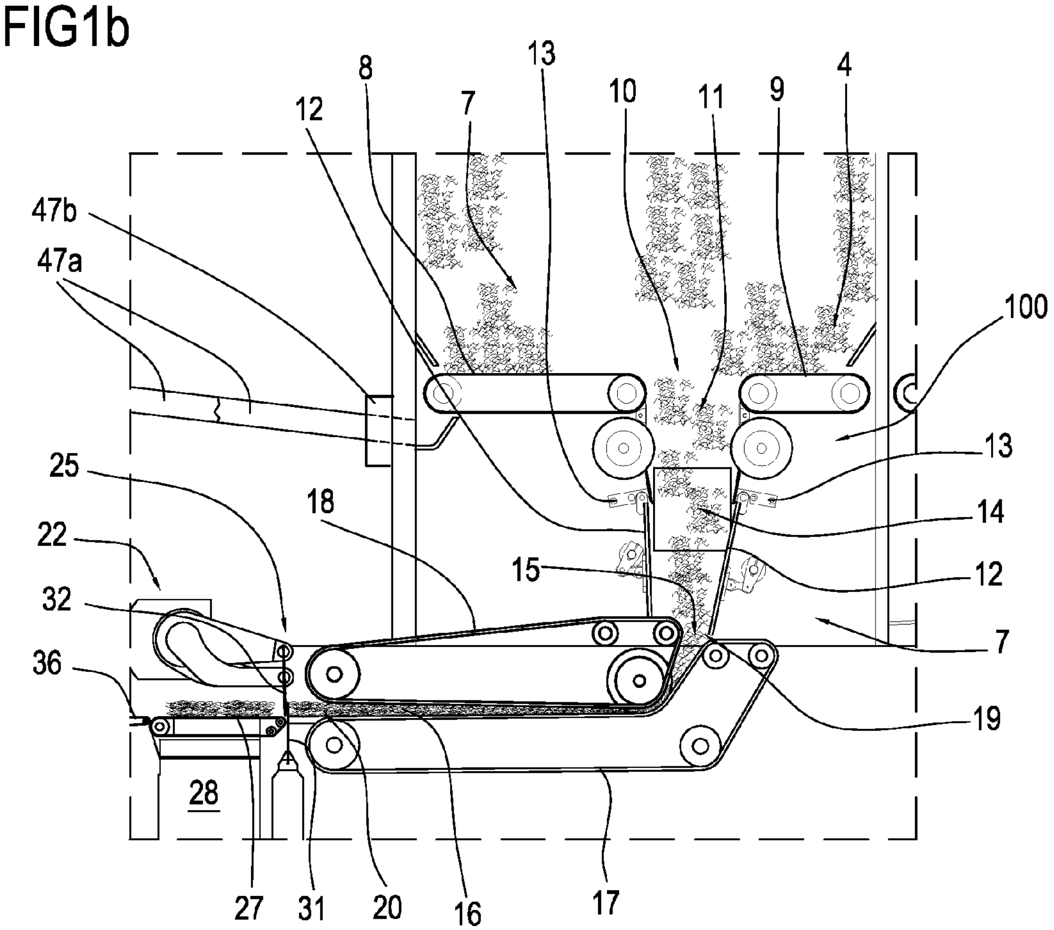
FIG. 1*b* is a front view of certain details of the machine of FIG. 1.
Figure 2:
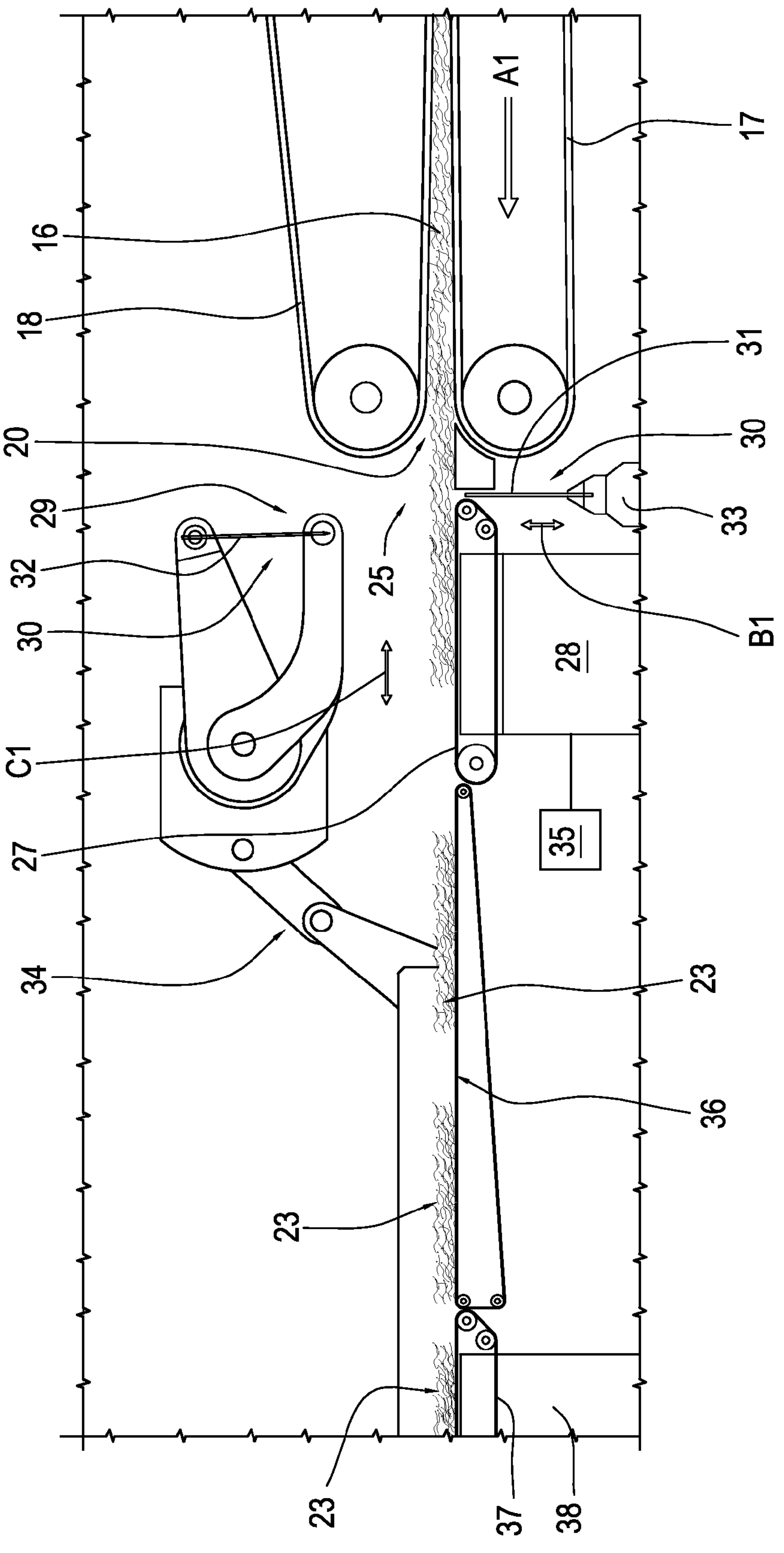
FIGS. 2, 3 and 4 are three front views of a part of the machine of FIG. 1 in three different operating conditions.

The delivery unit 5 which supplies the tobacco to the feed devices 6 comprises (FIG. 1*a*) four horizontal conveyor belts 21 designed to cooperate in pairs with the selfsame feed devices 6. More precisely, the two conveyor belts 21 of each pair are located side by side, run parallel to the wall 3 of the base 2 and have outfeed ends which are offset from each other relative to the infeed zones of the feed devices 6, so that the tobacco is fed into different zones of the selfsame feed devices 6. Infeed into different zones improves the regularity of tobacco feed into the feed devices 6 compared to the case where all the tobacco is poured into a single zone of the feed devices 6.

In the description which follows, reference will be made to the components and operations relating to only one of the tobacco layers 16 downstream of the respective passage 15, since both of the layers 16 are handled in exactly the same way and it being understood, as stressed above, that there are two identical passages 15 running side by side and along each of which two conveyor belts 17 and 18 advance a respective tobacco layer 16.

Downstream of the feed unit 4, the machine 1 comprises a portioning unit labeled 22 in its entirety.

As illustrated in FIGS. 1 and 2-4, the unit 22 divides the tobacco layer 16 into individual, separate portions 23 and feeds them to a specific packaging section or folding and sealing unit denoted in its entirety by the letter G.

The portioning unit 22 extends from an outfeed zone 25 of the tobacco layer 16 from the passage 15, and an outfeed zone, labeled 26, of the portions 23 from the selfsame portioning unit 22.

At each machine cycle, a leading end portion of the layer 16 enters the portioning unit 22, moved along by the conveyor belts 17 and 18, and settles on a horizontal conveyor belt 27 supported at the bottom by a first weighing device 28, and in the portioning unit 22, is separated from the rest of the layer 16 by separating means 29 operating in the portioning unit 22 itself.

The separating means 29 are located immediately downstream of the outfeed zone 25 and basically comprise loosening up elements 30 which separate the tobacco fibers of each portion 23 from those of the tobacco layer 16.

Preferably, the separating means 29 comprise a pair of loosening up elements 30.

The loosening up elements 30 are movable towards each other in order to separate each portion 23 from the layer 16 and, in the embodiment illustrated, they are at least partly defined by two combs 31 and 32, respectively upper and lower, movable towards and away from each other.

More precisely, the two combs 31 and 32 are movable cyclically, transversely to the forming direction A1 towards each other to define a blocked configuration where they at least partly occlude the end section 20 of the passage 15, and away from each other to define a flow configuration where they allow the leading end portion of the layer 16 to pass through freely.

Figure 3:
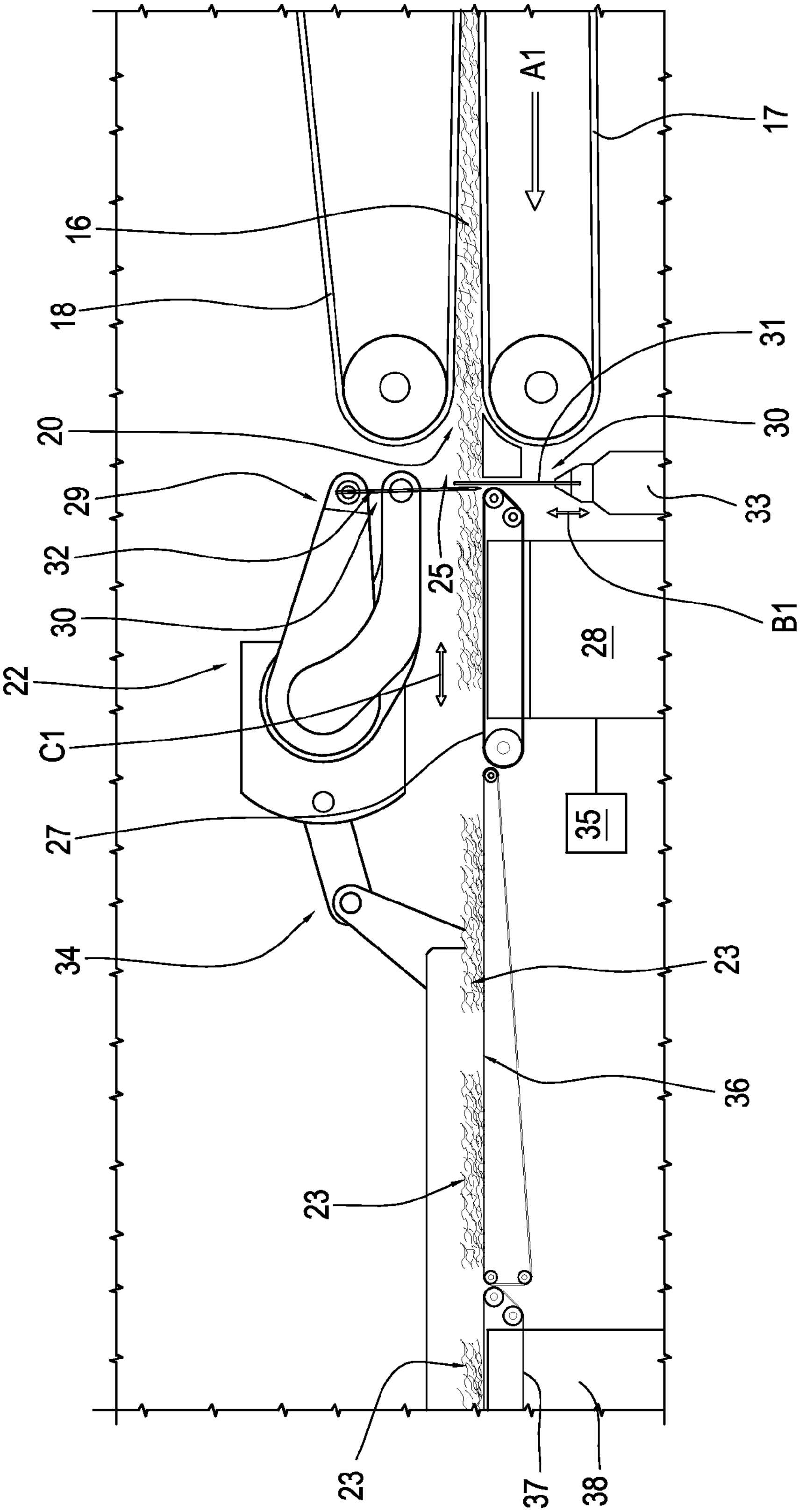

The first comb 31 is movable vertically along a first line of movement B1 substantially transversal to the forming direction A1 from a position outside the transit zone of the layer 16 (FIG. 2) to an occlusion position where it at least partly occupies that zone (FIG. 3).

In other words, the comb 31 is movable in gate-like fashion transversely to the layer 16.

The comb-like form allows the combs 31 and 32 to easily move through the fibers of the layer 16.

The second comb 32 is movable substantially along the line of movement B1 in a direction opposite to that of the first comb 31, so as to move towards, and preferably engage, the first comb 31 itself.

By "engage" is meant that the teeth of one comb simply interpenetrate the tooth gaps of the other without being mechanically locked to each other.

Figure 4:
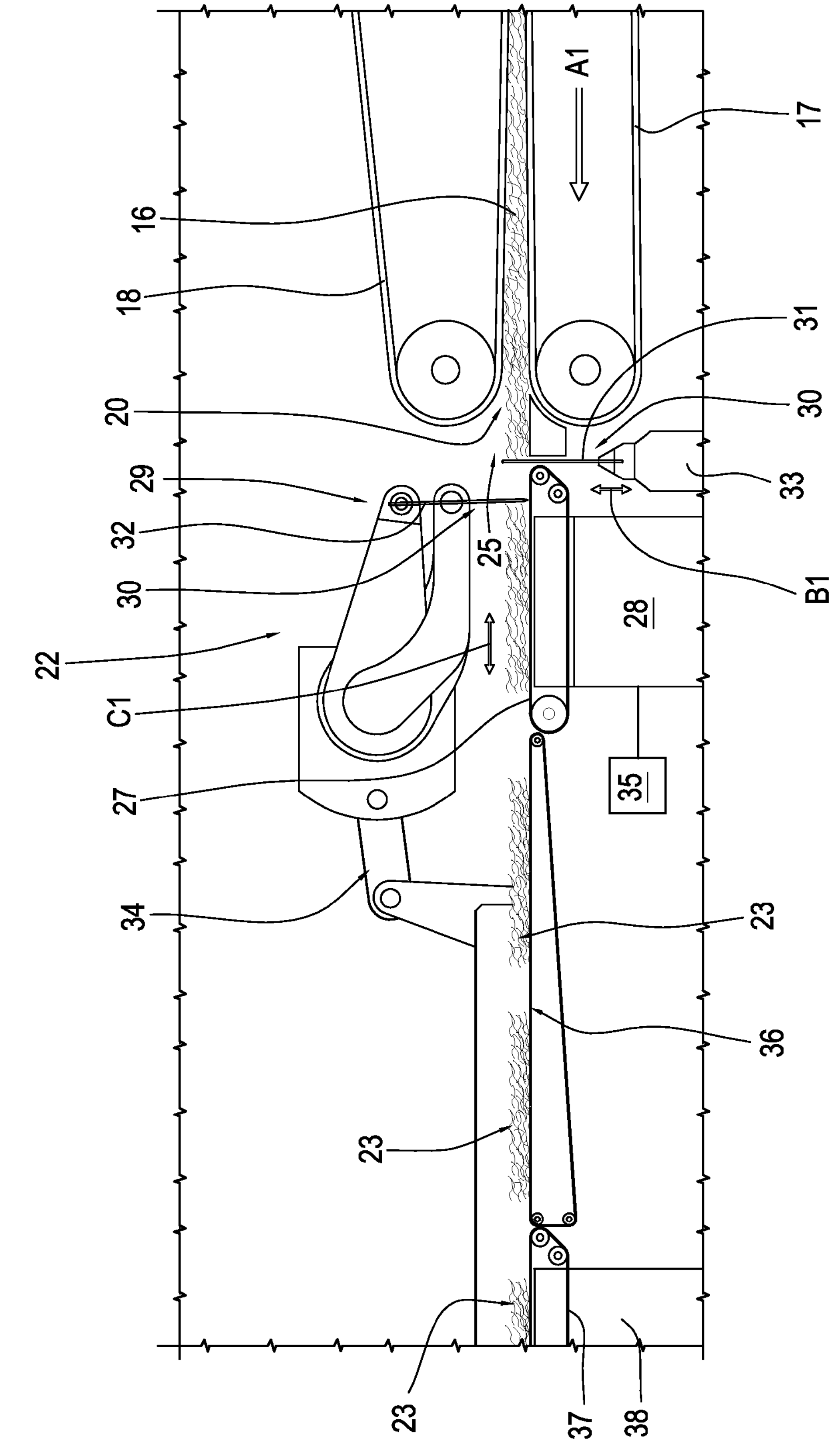

Further, as illustrated in FIG. 4, the second comb 32 is movable along a second horizontal line of movement C1, substantially transversal to the first line of movement B1, away from the first comb 31 in such a way as to separate each portion 23 which has just entered the portioning unit 22 from the layer 16, which is held in the duct 15 by the first comb 31.

In other words, the second comb 32 moves in "rake-like fashion", engaging the fibers of the portion 23 and detaching them from those of the rest of the layer 16.

The separating means 29 of the type described allow the portions 23 to be formed without cutting the tobacco fibers and thus without spoiling the quality of the tobacco.

The first comb 31 and the second 32 are connected to respective drive mechanisms 33 and 34 of per se known type, which allow them to move as described.

The leading end portion of each tobacco layer 16 is weighed progressively by the respective weighing device 28, in use, while it rests on the conveyor belt 27, and the movements of the combs 31 and 32 and of the conveyor belts 17 and 18 are activated, based on the weight measured, by a control unit 35 of per se known type, according to a defined time scale such that portions 23 of tobacco are removed from the layer 16 when their weight is equal to, or just under, the nominal target weight of the portions 23 themselves. More specifically, the weight check performed by the device 28 also has the purpose of detecting variations of weight arising out of variations of tobacco density in the leading end portion of the layer 16 and of the portions 23, and the weight corrections described above are activated also as a function of that parameter.

It should be noted that each time the combs 31 and 32 are set to the blocked configuration by the control unit 35, the conveyor belts 17 and 18 are stopped by the control unit 35 itself in order to prevent the layer 16 from "sticking" and becoming misshapen.

Immediately downstream of each conveyor belt 27, with reference to the feed direction of the tobacco layer 16 and of the portions 23, there is a horizontal conveyor belt 36 positioned to form a continuation of the conveyor belt 27 itself.

Downstream of each conveyor belt 36 there is a further horizontal conveyor belt 37, supported at the bottom by a second weighing device 38 designed to check that the weight of each portion 23 separated from the layer 16 corresponds to a predetermined weight value.

The weighing device 38 acts as a feedback control for the weighing device 28, that is to say, it is functionally connected to the weighing device 28 to send a corrective signal to the weighing device 28 itself when the weight of a tobacco portion 23 does not correspond to the predetermined weight value. This makes the division of the tobacco into portions 23 more precise.

Immediately downstream of the conveyor belts 37 associated with the weighing device 38, with reference to the feed direction of the tobacco portions 23, there is a horizontal conveyor belt 39 positioned to form a continuation of the conveyor belt 37 itself.

The portioning unit 22 comprises a supplemental feeding device 40 located above the conveyor belt 39.

The supplemental feeding device 40 is designed to add tobacco to the portions 23 carried by the conveyor belt 39 if their weight, measured by the weighing device 38, is less than the preset target weight.

As a result, the weighing device 38 is functionally connected to the supplemental feeding device 40, preferably through the control unit 35.

Figure 4A:
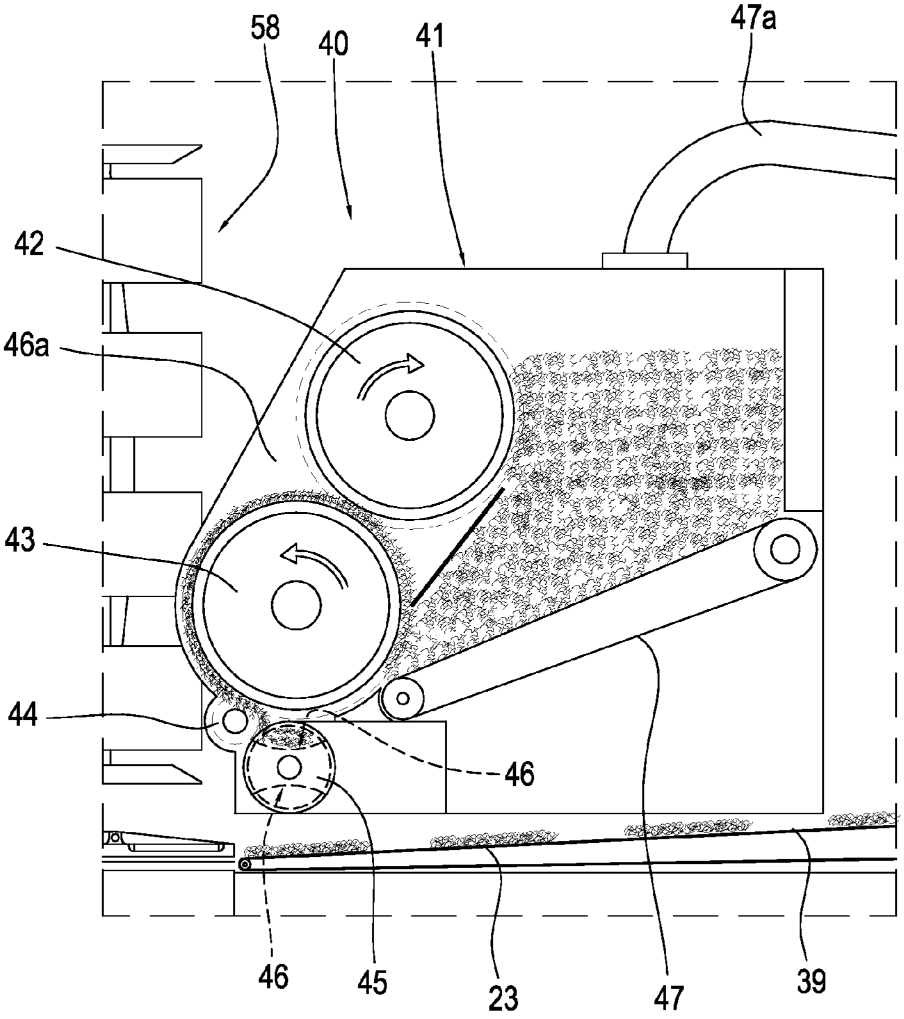
FIG. 4*a* is an enlarged front view of certain details of the machine of FIG. 1.

The supplemental feeding device 40 comprises a box-shaped element 41 which houses, above each conveyor belt 39, two needle rollers 42 and 43 provided on the respective cylindrical lateral surfaces with a plurality of radial needles not illustrated. The rollers 42 and 43 are rotatable in opposite directions about respective horizontal axes parallel to each other and are connected to a source of rotary drive motion not illustrated. The roller 42 is located above, and slightly to the right of, the roller 43 (FIG. 4*a*) and rotates clockwise. The rollers 42 and 43 are located near one another in such a way that the zone between them forms a passage whose width is substantially equal to the height of the radial needles covering the lateral surfaces of the rollers 42 and 43 themselves.

Alongside the bottom of the roller 43 there is a further needle roller 44 provided on its cylindrical lateral surface with a plurality of radial needles not illustrated, rotatable clockwise about a horizontal axis parallel to the axes of rotation of the rollers 42 and 43 and being considerably smaller in size than the rollers 42 and 43. The roller 44 and the roller 43 together form, at the zone between them, a passage whose width is substantially equal to the height of the radial needles covering the lateral surfaces of the rollers 43 and 44 themselves.

On the right of the roller 44, near its lateral surface, there is a substantially cylindrical distribution roller 45 which is rotatable stepwise about an axis parallel to the axes of the needle rollers 42, 43 and 44 and which is equipped peripherally, for each conveyor line for the tobacco portions 23, with two diametrically opposite pockets 46 designed to accommodate small quantities of tobacco carried towards the distribution roller 45 by the roller 44.

The rollers 42, 43, 44 and 45 above one conveyor belt 39 are separated from the other conveyor belt 39 by a vertical wall 46*a* perpendicular to the axes of the selfsame rollers 42, 43, 44 and 45.

An upper part of the box-shaped element 41 is connected, by two substantially horizontal ducts 47*a*, each of which leads into the selfsame box-shaped element 41 above one of the two conveyor belts 47, to two pumps 47*b* (only one of which is illustrated) communicating respectively with zones adjacent to the left-hand ends (FIG. 1) of the conveyor belts 8 of the two feed devices 6.

A conveyor belt 47 which is slightly inclined to a horizontal plane is located inside the box-shaped element 41 at a level substantially coinciding with that of the bottom of the roller 43, in such a way as to push towards the roller 43 itself the tobacco that reaches the box-shaped element 41 through the ducts 47*a*.

In use, periodically, or when the amount of tobacco inside the box-shaped element 41 is less than a predetermined amount, the feed direction of the conveyor belts 8 is momentarily, and for a very short time, reversed relative to the normal direction in order to convey an adequate amount of tobacco towards the pumps 47*b*, which send it to the selfsame box-shaped element 41 through the ducts 47*a*.

Figure 4B:
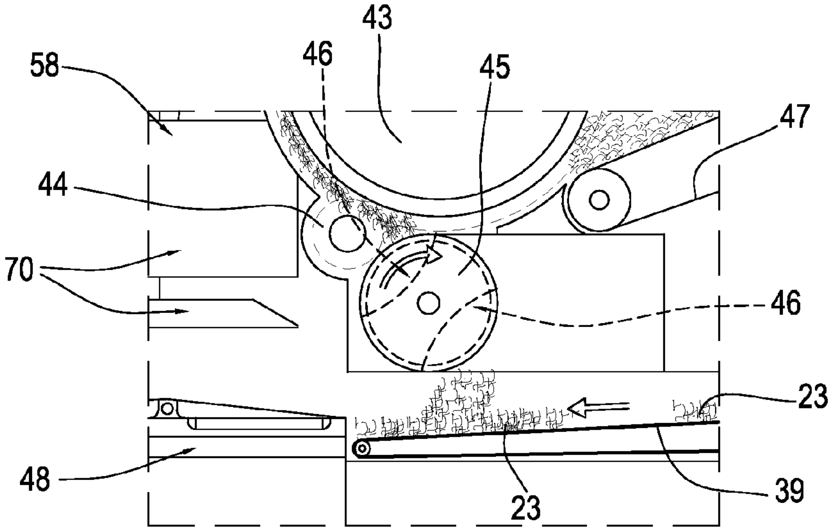
FIG. 4*b* shows a scaled-up view of certain details from FIG. 4*a*.

Each time the weighing device 38 detects that one or both of the side-by-side portions 23 is/are underweight, the respective rollers 44 are momentarily set in rotation by the control unit 35, for a length of time that varies as a function of the detected weight difference, so as to allow the radial needles covering the rollers to carry a suitable quantity of tobacco towards one of the pockets 46 of the respective distributor roller/rollers 45. Feeding the two measured quantities of tobacco into the pockets 46 is coordinated by the control unit 35 in such a way that these measured quantities are dropped onto the underweight tobacco portions 23 at exactly the right moment after the distributor roller 45 has rotated through 180° about its axis (FIG. 4*b*).

The two weighing devices 38 associated with the conveyor belts 37 separately check the weight of each of the two side-by-side tobacco portions 23 which, with every machine cycle, move into place over the weighing devices 38 themselves. Further, as mentioned above, the assemblies made up of the rollers 42, 43 and 44 and the distributor roller 45, are made separately for each of the underlying conveyor belts 39. The assemblies 42, 43, 44, 45 for each conveyor belt 39 are motor-driven independently of the others so that the tobacco portions 23 from the layers 16 further from and closer to the wall 3 of the base 2, respectively, are served by a respective half of the selfsame assemblies 42, 43, 44, 45, controlled independently by the control unit 35 in order to independently correct the weight of each portion 23 of each pair of side-by-side tobacco portions 23. In other words, the supplemental feeding device 40 is divided into two distinct halves associated with respective conveyor belts 39 for the portions 23 obtained from respective tobacco layers 16, and each distinct half of the supplemental feeding device 40 is respectively served by a weighing device 38 of the portions 23 transported by the conveyor belt 39 associated with the respective half of the selfsame supplemental feeding device.

According to a variant of the invention, not illustrated, the weighing devices 28 and 38 (or only one of them) might be of the capacitive type, made in a per se known manner, acting without coming into contact with the layers 16 or with the tobacco portions 23.

The portioning section 100 of the machine 1 communicates with a bagging section 200 by which the tobacco portions 23 are placed in bags.

The infeed part of the bagging section 200 comprises compacting means 48 (FIGS. 5-7), located in the proximity of the outfeed ends of the conveyor belts 39 which transport in succession the aforementioned pairs of side-by-side portions 23 which have just passed under the supplemental feeding device 40.

Figure 6:
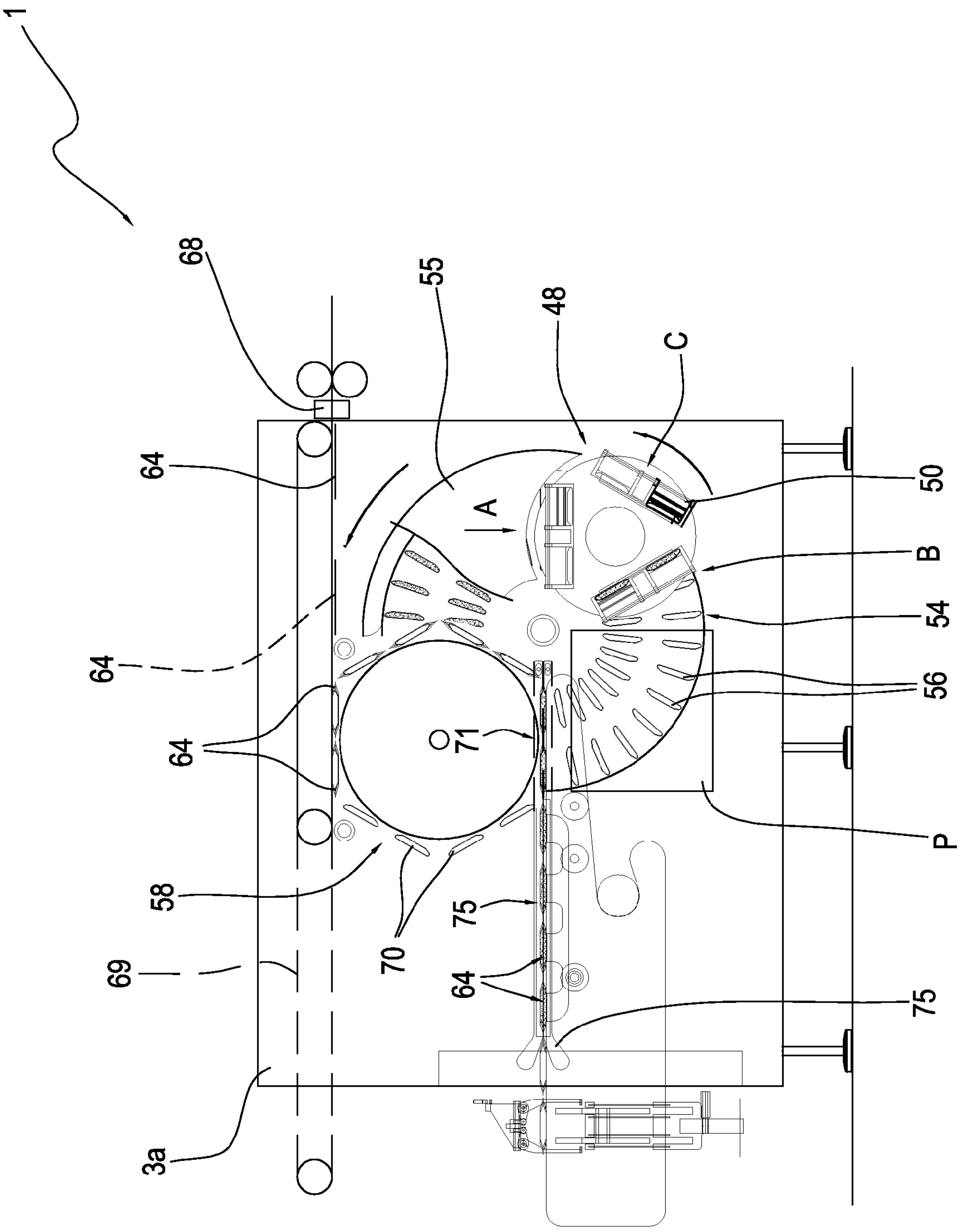
FIG. 6 is a front view of a part of the machine of FIG. 1.
Figure 6A:
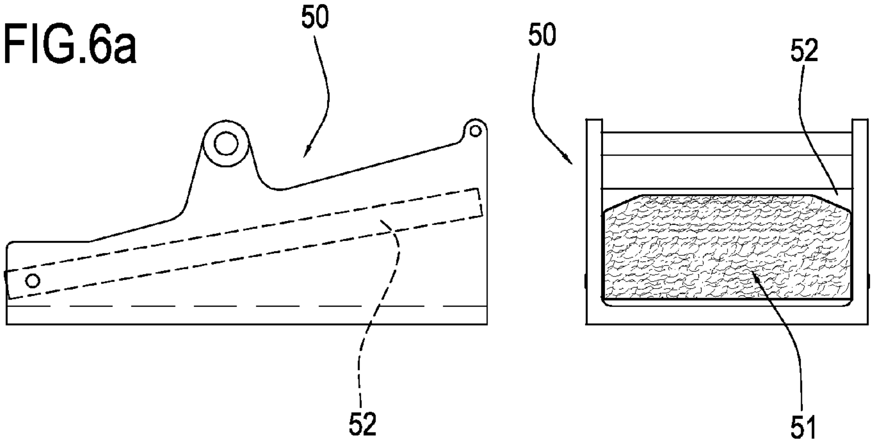
FIGS. 6*a* and 6*b* are side views of certain details from FIG. 6 in two different operating conditions.

The compacting means 48 consist basically of a transfer conveyor and comprise a rotary support 49 which, if observed from the front, is substantially in the shape of an equilateral triangle. The rotary support 49 is rotatable stepwise about a horizontal axis perpendicular to the wall 3 and mounts, at each of its three lateral faces, two containment and compaction elements consisting of receptacles 50 placed side by side and each provided with a containment compartment 51 and a lid 52 hinged to one end of the respective receptacle 50 (FIG. 6). A full turn of the rotary support 49 about its axis is completed in three rotation steps. The lids 52 of the receptacles 50 are made and hinged in such a way as to oscillate in both directions about their hinges under the action of linkage mechanisms of per se known type, thereby occupying alternately one or the other of two positions, shown in FIGS. 6*a* and 6*b*, respectively, where the receptacles 50 themselves are respectively "open", that is with the respective inlet opening as large as possible to facilitate receiving a portion 23, and "closed", that is, with the lid 52 withdrawn into the receptacle 50 in order to reduce the latter's capacity and thus lightly compress the tobacco of the portion 23 contained in the receptacle 50 itself.

Figure 6B:
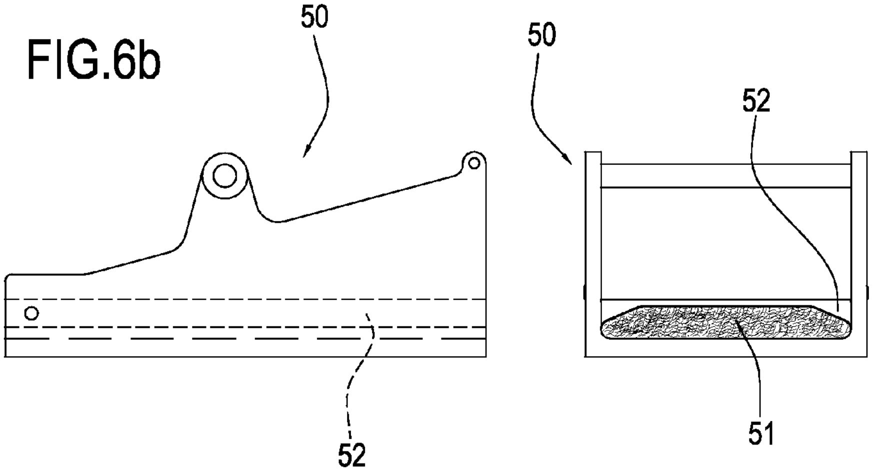
Figure 7:
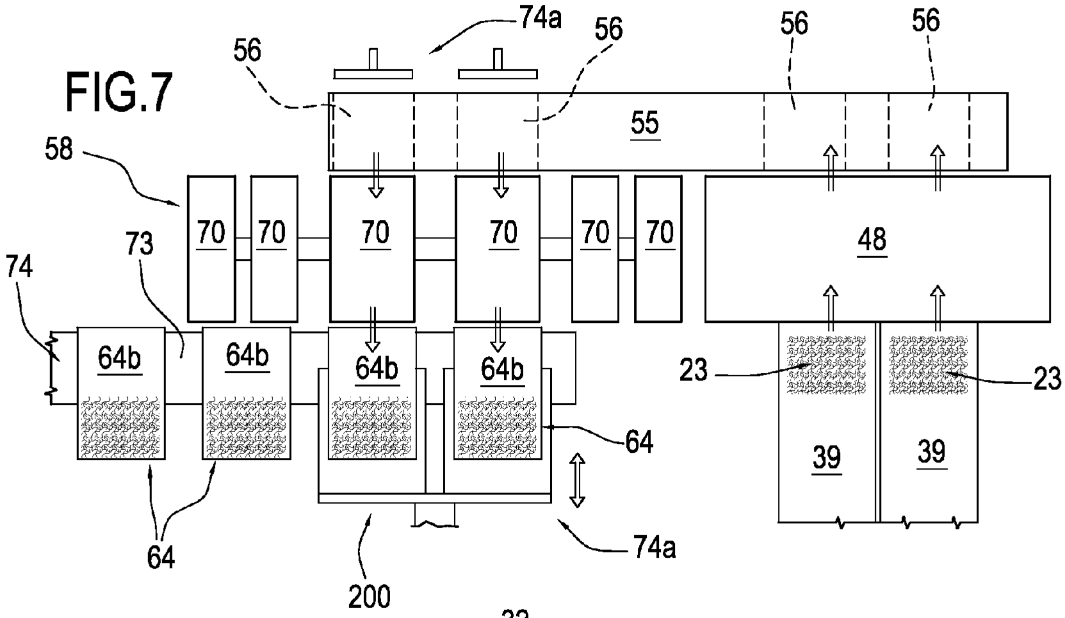
FIG. 7 is a schematic plan view of certain details of the machine of FIG. 1.

The tobacco portions 23 of each pair from the conveyor belt 39 are, in use, placed into respective open receptacles 50 forming part of the pair of side-by-side receptacles 50 which are supported at the top by a horizontal wall of the rotary support 49 and whose lids 52 are open (FIG. 6*a*), and are compacted when the receptacle lids 52 are closed (FIG. 6*b*).

The receptacles 50 are open on the front and rear sides and this enables a tobacco portion 23 to be pushed into the compartment 51 of each receptacle 50 by suitable reciprocating pushers (not illustrated).

Both the total number of groups of receptacles 50 and the number of receptacles in each group of side-by-side receptacles 50 may vary according to the tobacco feed lines the machine 1 is equipped with or based on the production speed desired.

As they follow their circular path determined by the stepwise rotation (in anticlockwise direction) of the rotary support 49, the receptacles 50 pass through a loading station A where the tobacco portions 23 from the conveyor belts 39 are loaded, an unloading station B where the portions 23 are unloaded onto a transfer conveyor comprising compression and forming means 54, and a rejection station C, of per se known type and not illustrated, where any tobacco portions 23 that do not conform with certain parameters are rejected.

The rejected material is recovered (in a manner not illustrated) and recycled upstream to a tobacco handling unit connected to the delivery unit 5.

The compression and forming means 54, which keep the tobacco portions 23 in the compressed condition and allow them to be given a predetermined compact form, comprise a drum 55 which is rotatable stepwise about an axis of rotation parallel to the axis of rotation of the rotary support 49 and which is positioned between the selfsame rotary support 49 and a wall 3*a* perpendicular to the aforementioned wall 3 of the base 2. The drum 55 is provided with a plurality of housings 56 into which the tobacco portions 23 from the receptacles 50 are inserted and kept in a compressed condition for a certain length of time. The housings 56 are arranged in pairs which are angularly equispaced from each other about the axis of the drum 55 and each of which consists of two housings 56 extending diametrically relative to the drum 55 and situated at different distances from the selfsame drum 55. In other words, the housings 56 are radially aligned in pairs and are thus arranged in two concentric circular rings coaxial with the drum 55, so as to be able to handle two packaging lines for tobacco portions 23 (as in the machine 1 described herein by way of example). Obviously, in a machine with a single packaging line there would only be one ring of housings on the drum 55 and in a machine with more than two packaging lines, the drum 55 would have as many concentric rings of housings 56 as there are packaging lines.

The housings 56 of each pair are arranged relative to one another and shaped in transversal cross section to match two adjacent receptacles 50 of the compacting means 48 with the respective lids 52 in the closed position.

At the unloading station B of the compacting means 48 there are pusher means (not illustrated) designed to extract the tobacco portions 23 from two side-by-side receptacles 50 in the stop condition and to insert them into corresponding housings 56 forming part of the drum 55.

In proximity of an upper left-hand part of the drum 55 on the same side of the drum 55 as the rotary support 49, there is a transfer conveyor consisting of a carousel 58, rotatable stepwise about a respective axis of rotation parallel to the axes of rotation of the rotary support 49 and of the drum 55, and designed to receive in succession bags 64 intended to contain respective tobacco portions 23 from a unit 59 which makes the bags 64 themselves. The carousel 58 will be described in more detail below.

Figure 12:
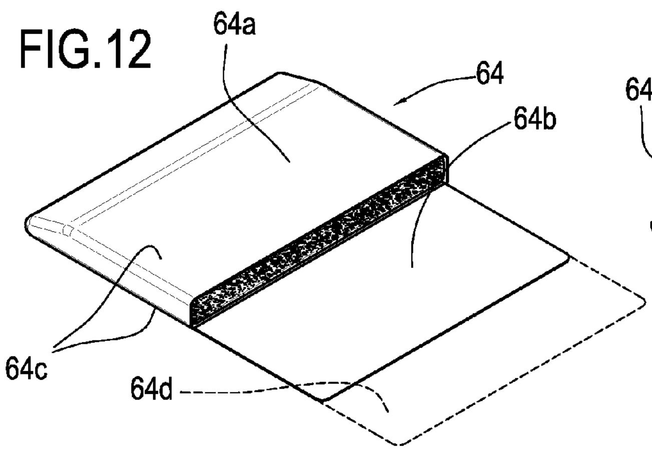
FIGS. 12 and 13 are two perspective views of a bag containing tobacco, in an open and closed condition, respectively, and which can be made using the machine of FIGS. 1-11.
Figure 13:
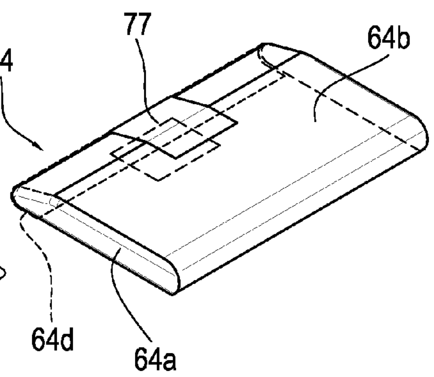
Figure 8:
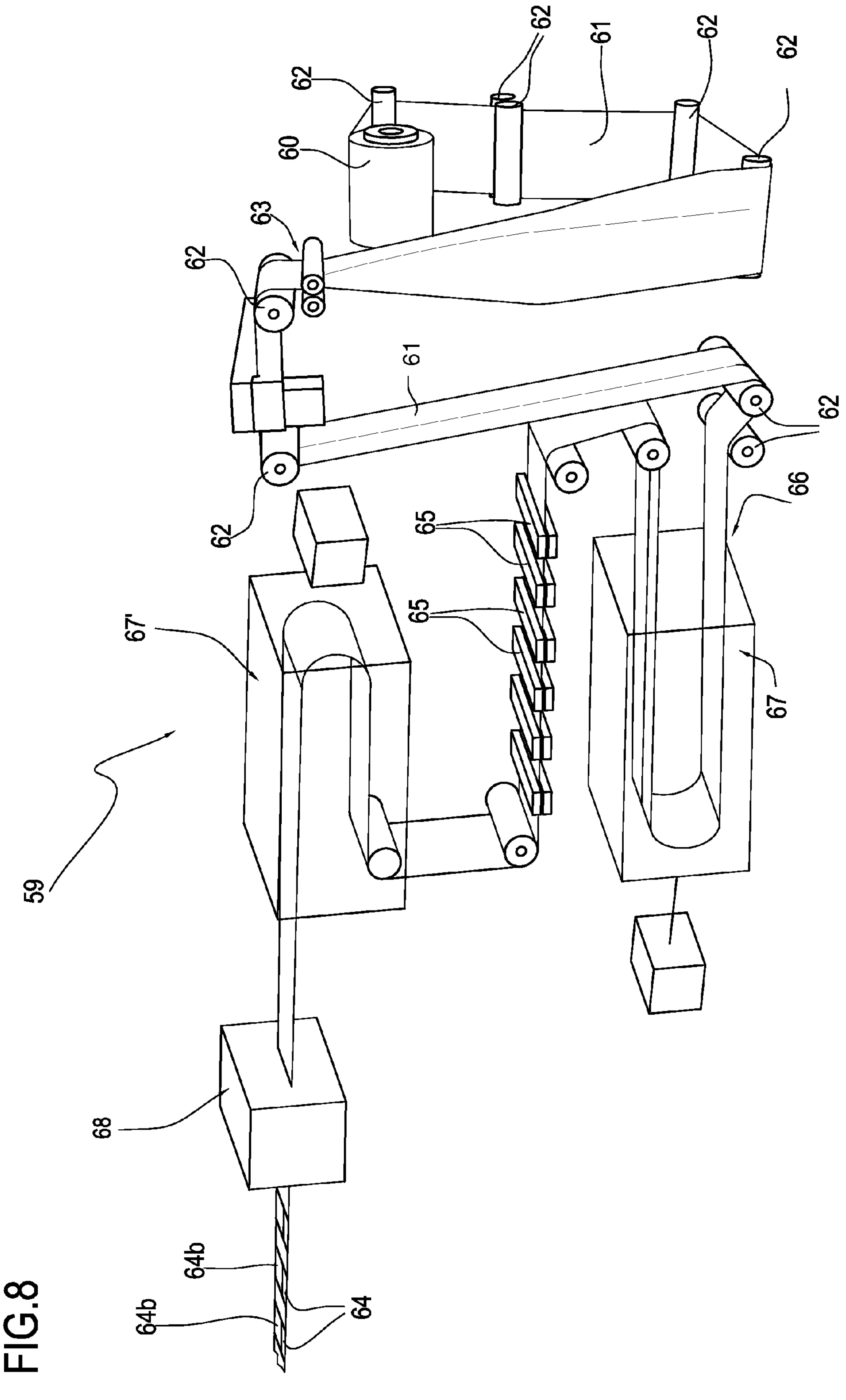
FIG. 8 is an axonometric view of a part of the machine of FIG. 1.
Figure 9:
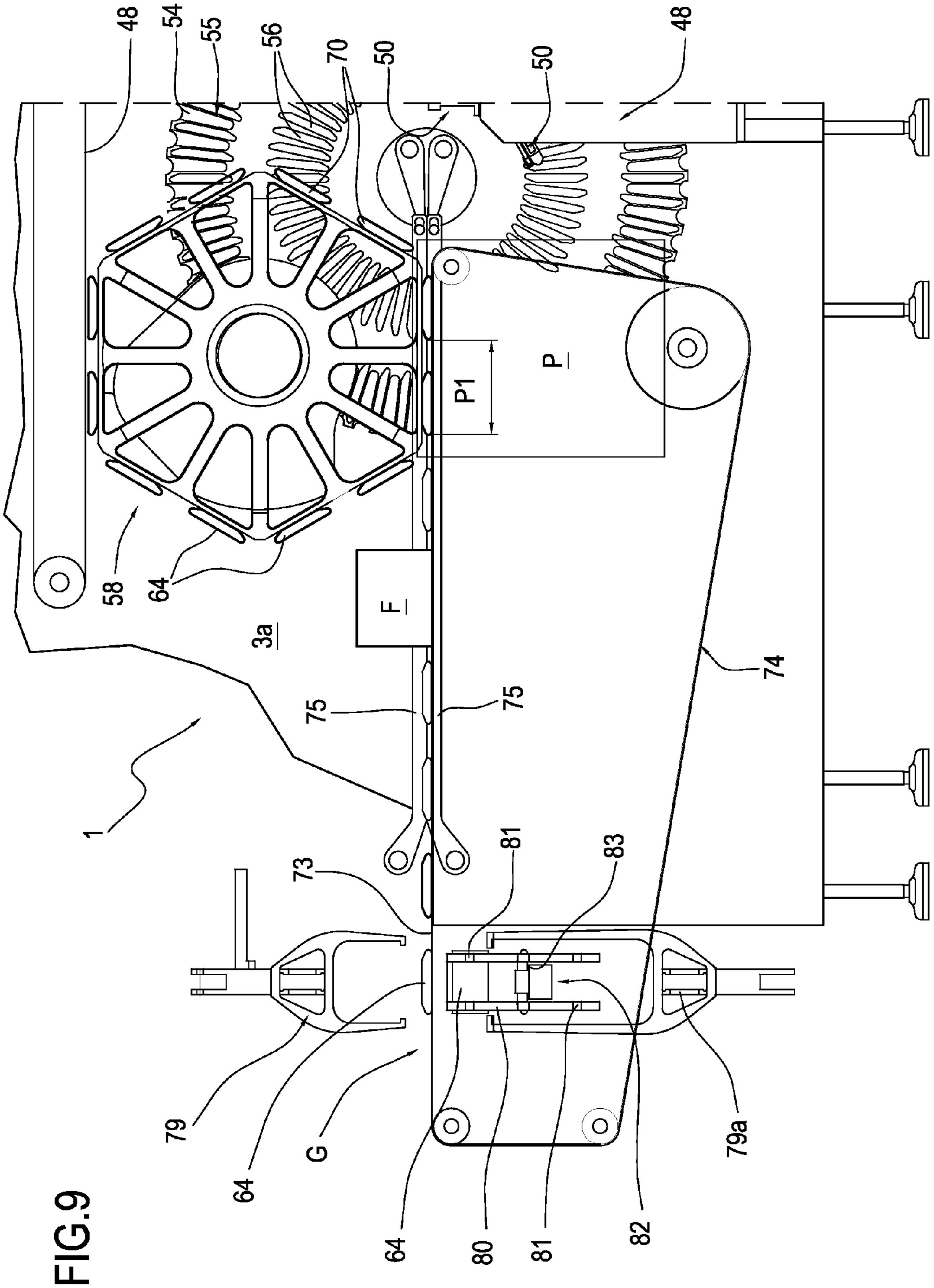

The unit 59, illustrated in FIG. 8, comprises a reel 60 from which known unwinding means not illustrated unwind preferably continuously a web 61 of gapping material which is guided by a plurality of feed and drive rollers 62 towards a folding section 63. In the folding section 63 the web 61 is folded longitudinally on itself into a shape which, after being sealed and cut as described below, allows forming, for each bag 64 made, a pouch-like portion 64*a* intended to contain tobacco and closed by a flap panel 64*b* (see FIGS. 12 and 13 in particular). According to a variant of the bags 64 represented by dashed lines in FIGS. 12 and 13, the closing flap panels 64*b* of the bags 64 are long enough to allow them, in the closed condition, to cover the front surface of the bags 64 completely and in such a way that a portion 64*d* of the closing flap panels 64*b* themselves can be folded round the bottom of the bags 64 to also cover a lower portion of the bags 64 themselves.

Suitable sealing means of per se known type, denoted by the numeral 65 and located downstream of the folding section 63, seal the web 61 along sealing lines transversal to the extension of the web so as to seal the lateral edges of the bags 64.

Between the folding section and the sealing means 65 there is a temporary accumulation device comprising a pneumatic buffer 66 (which might be mechanical according to a variant not illustrated) through which the web 61 passes. The buffer 66 essentially comprises a box-shaped element 67 through which a loop of the web 61 passes and the inside of which is kept at a pressure below atmospheric pressure in order to allow feeding the web 61 stepwise to the sealing means 65 by releasing periodically variable quantities of the web 61 itself.

Downstream of the sealing means 65 there is a cutting station 68 where the web 61, now folded and sealed, is divided into single bags 64 to be directed towards the aforementioned carousel 58. The web 61 is preferably conveyed to the cutting station 68 by a continuous feed motion after passing through a temporary accumulation device comprising a buffer 6T, identical to the buffer 66, between the sealing means 65 and the cutting station 68.

A conveyor belt 69 receives and holds back by suction on its lower horizontal section the bags 64 arriving in succession from the cutting station 68. The lower transporting section of the conveyor belt 69 is positioned at substantially the same level as the upper portion of the carousel 58 on the side of the carousel 58 opposite to the drum 55.

The carousel 58 has on its hexagonal periphery a plurality of supporting elements consisting of carrier elements 70 projecting from it and each being designed to carry a respective empty bag 64.

The carrier elements 70 distributed round the periphery of the carousel 58 are grouped in pairs, as illustrated in FIGS. 5, 6, 7 and 9, so as to be able to handle a double production line, each of the pairs being, in the embodiment illustrated, located on one side of the hexagon defining the periphery of the carousel 58. There may, however, be only one or more than two carrier elements 70 in each group, depending on the design and production specifications of the machine 1 (in the case of a machine with a single production line or more than two production lines, respectively).

Each carrier element 70 comprises a hollow body of flattened form, shaped in such a way that it can be inserted into the pouch of the respective bag 64, thereby holding the selfsame bag 64 open to allow the insertion of the portion 23 of tobacco, as will become clearer as this description continues. Blowing means (not illustrated) are provided which, by blowing a jet of air, keep the panels 64*c* apart to define the opening of the pouch-like portion 64*a* and thereby facilitating opening each pouch-like portion 64*a* and inserting a hollow body or carrier element 70 into the pouch-like portion 64*a* itself.

It should be noted that the machine 1 may comprise (FIG. 6) a compressed air cleaning system P, located preferably in the proximity of a flank of the aforementioned drum 55, under the carousel 58, to clean the housings 56 of any residual tobacco before the housings 56 themselves, after being emptied in a manner which will become clearer as this description continues, are filled with tobacco again.

In use, at each machine cycle, two bags 64 transported towards the carousel 58 by the lower section of the conveyor belt 69 are removed in succession from the selfsame lower section by suitable pickup means, consisting for example of suction elements not illustrated, and are aligned with respective carrier elements 70 of the carousel 56 associated with a horizontally positioned upper surface of the selfsame carousel 58. The action of the blowing means keeps the panels 64*c* of the bag 64 apart and the bag 64 is placed round a respective carrier element 70 with its closing flap panel 64*b* directed towards the drum 55 and lying in a horizontal plane delimiting the top of the bag 64.

At a zone of the carousel 58 diametrically opposite the zone where the carousel 58 receives the bags 64, that is to say, at the bottom of the carousel 58, there is a station 71 for filling the bags 64 with tobacco.

Each pair of carrier elements 70 which have received respective bags 64 in the manner described above, moves into the station 71 in a rotation of the carousel 58 through 180° about its axis. At the station 71, the tobacco portions 23 inside two radially aligned, adjacent housings 56 of the drum 55 are extracted simultaneously from the carrier elements 70 through the agency of reciprocating transfer or pusher means 74*a* which move along a direction parallel to the axes of the drum 55 and carousel 58. The pusher means 74*a*, during their forward stroke, sweep the housings 56 to extract the tobacco portions 23 and push them into respective bags 64 supported by respective carrier elements 70 of the carousel 58 and then remove the two bags 64 containing the portions 23 and place them on the upper, horizontal conveyor section 73 of a transfer conveyor comprising a conveyor belt 74 running parallel to the wall 3*a*. The parts of the conveyor section 73 of the conveyor belt 74 which come into contact with the bags 64 are provided with a plurality of holes (not illustrated) in communication with a suction source (not illustrated) and designed to hold the bags 64 down against the conveyor section 73 itself.

The closing flap panels 64*b* of the bags 64 resting on the conveyor belt 74 are substantially co-planar with the conveyor section 73 (that is to say, they lie in the same plane as the lower portions of the respective bags 64, and extend towards the wall 3*a* of the base 2.

Just above and below the path followed by the bags 64 travelling on the conveyor belt 74 there are two movable guide elements 75, each of which consists basically of a substantially horizontal rod hinged at the ends to fixed supporting means and associated with drive means (not illustrated) designed to impart to it small movements up and down. Alternatively, the rods 75 might be hinged to the fixed supporting means at one end only. The guide elements 75 are positioned above and below the bags 64 carried by the conveyor belt 74, run alongside the bags 64 at the portions 64*a* thereof located in the proximity of the panels 64c, and can be momentarily driven apart far enough away from the path of the bags 64 each time two bags 64 need to be transferred onto the conveyor section 73, and then towards each other again immediately after such transfer until lightly touching the panels 64c, which are thus held against each other to prevent tobacco from coming out of the bags 64. The light contact between the guide elements 75 and the panels 64c of the bags 64 allows the bags 64 to be transferred to the further operating stations by the conveyor belt 74 without damaging the bags 64 and without scoring or scratching their delicate outside surface.

It should be noted that, alternatively to the above, the lower guide element 75 might be substituted for a fixed strip (not illustrated) placed in permanent contact with an underside surface of the bags 64 and designed to act in conjunction with the upper guide element 75 to keep the panels 64c adherent to each other during transportation on the conveyor belt 74.

Downstream of the filling station 71, each bag 64 filled with a tobacco portion 23 and transported by the conveyor belt 74 passes through a sealing station where a sealing device, schematically represented as a block F, mounted next to the guide element 75, acts in conjunction with the guide element 75 itself to seal the panels 64c of the bags 64 in the proximity of the zone of action of the selfsame guide element 75. Preferably, sealing applies to a layer of lacquer which at least partly covers the inside surface of the bags 64.

Downstream of the sealing device F there is a folding and sealing unit G designed to fold the closing flap panel 64b of each bag 64 onto the respective portion 64a, and to apply a closing tab 77 and a revenue stamp or label on the bag 64 itself.

In use, the conveyor belt 74 for transferring the bags 64 to the sealing station where the sealing device F works and to the subsequent folding and sealing unit C is driven according to the cycle of movements described below.

After each time two bags 64 containing respective tobacco portions 23 are transferred to the conveyor section 73 by the pusher means 74a, the conveyor belt 74 is started and is fed one step forward for a length equal to twice the spacing P1 between two consecutive bags 64 supported by it, in order to feed the bags 64 supported by it to the folding and sealing unit G, thereby causing them to travel a distance equal in length to the feed step.

When the conveyor belt 74 stops, the carousel 58 effects a rotation step and, substantially simultaneously, the bag 64 located at the end of the conveyor belt 74 itself (that is, the one furthest from the filling station 71) is then removed from the conveyor belt 74 by a gripping element 79, in a manner which will become clearer as this description continues, to reach the infeed section of the folding and sealing unit G.

The conveyor belt 74 is then started again and is fed one step forward for a length equal to the spacing between two consecutive bags 64 supported by it and, during this forward movement, the sealing device F acts on the bags positioned within its range of action, holding them still in the sealing station (acting preferably on all the bags 64 situated between the transfer zone of two bags 64 on the conveyor section 73 and the zone occupied by two consecutive bags 64 at the far end of the conveyor belt 74). During this step, if desired, a lifting apparatus (not illustrated and, for example, comprising horizontal lift slats) might be provided to slightly lift the bags 64 off the conveyor section 73 of the conveyor belt 74 while they are being sealed.

When the conveyor belt 74 stops, the bag 64 which has reached the far end of the conveyor belt 74 is removed from the conveyor belt 74 by the transfer means comprising the gripping element 79 and a vertically reciprocating counter-pusher element 79a below it and is also moved to the infeed section of the folding and sealing unit G.

Next, another two bags 64 containing respective tobacco portions 23 are transferred to the conveyor section 73 by the aforementioned pusher means and the conveyor belt 74 is driven to repeat the same cycle of movements as that described above.

In other words, the conveyor belt 74 moves forward intermittently according to a law of motion which involves cyclically moving forward by a step equal in length to twice the spacing between two consecutive bags 64 supported by it, followed by a step equal in length to the spacing between two consecutive bags 64. After each step, one bag 64 is transferred from the conveyor belt 74 to the folding unit G, and after each pair of consecutive steps, two bags 64 are transferred from the carousel 58 to the conveyor belt 74 itself.

Figure 10:
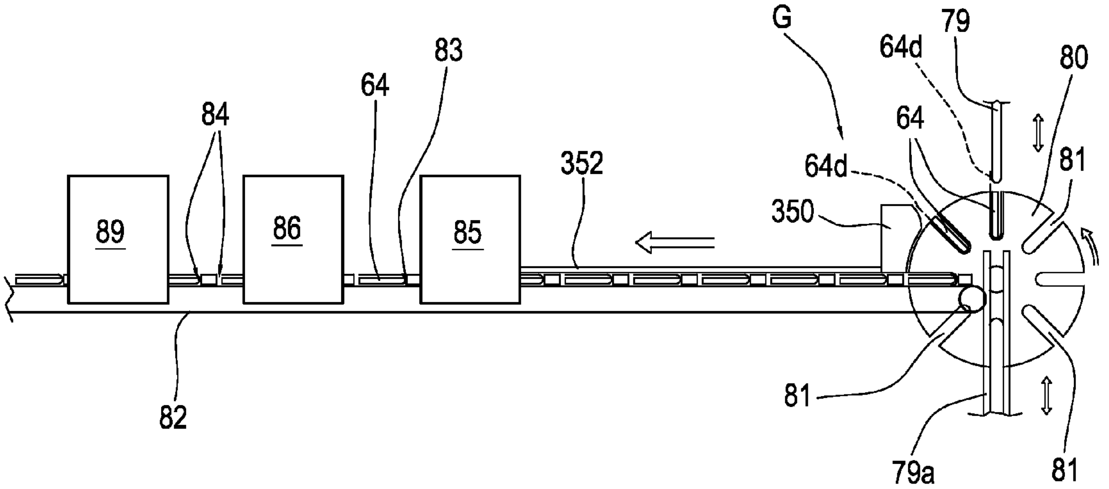
FIGS. 9 and 10 are front views of respective parts of the machine of FIG. 1.

As shown in FIG. 10, the infeed section of the folding and sealing unit G consists of a folding wheel 80 rotatable stepwise about a horizontal axis parallel to the transporting direction of the conveyor belt 74 and positioned substantially under the selfsame conveyor belt 74. The folding wheel 80 is provided on its periphery with a plurality of radial cavities 81 (eight in the example shown) angularly equispaced from each other and each designed to receive a bag 64.

In use, as it enters the radial cavity 81, the closing flap panel 64b of each bag 64 is folded by an angle of 180° onto the portion 64a of the bag 64 itself.

A compartment conveyor belt 82 having an upper, horizontal conveyor section 83 has an end part, on the right in FIG. 10, which is contained within the folding wheel 80, and which is capable of removing the bags 64 in succession from the radial cavities 81 of the wheel 80 itself and placing them into respective compartments 84.

If the closing flap panels 64b of the bags 64 are, as described above, provided with the aforementioned portion 64d, that is to say, if they are long enough to allow them, in the closed condition, to cover the front surface and a lower portion of the rear surface of the bags 64, a part of the folding wheel 80 between the zone of action of the gripping element 79 and the zone of transfer of the bags 64 into respective compartments 84 of the conveyor belt 82 has alongside it a fixed folder 350 designed to fold the closing flap panels 64b against the bottoms of the respective bags 64 (FIG. 10). One edge of a fixed wall 352 above the conveyor belt 82 then folds the end portion of each panel 64b against a lower portion of the rear surface of each bag 64.

The bags 64 carried by the conveyor belt 82 are fed in succession towards two devices, of per se known type and schematically represented as blocks 85 and 86, designed to apply, respectively, to each bag 64 the aforementioned sealing tab 77 and a revenue stamp or label not illustrated. A further device 89, of per se known type, may be provided along the path of the conveyor belt 82 to apply to the bags 64 respective adhesive labels bearing text or images on them.

The completed bags 64 can then be removed from the conveyor belt 82 (in a manner not illustrated) and fed to further processing apparatuses (not illustrated).

According to a variant of the invention not illustrated, the unit 59 for making the bags 64 might not be provided and the bags 64 might be ready-made, stored in a magazine and transferred from the magazine to the aforementioned conveyor belt 69.

According to a further variant of the invention, illustrated schematically in FIG. 11, the conveyor belts 27 associated with the weighing devices 28 might be substituted for trays 87 on which the tobacco layers 16 pass. More specifically, in that case, for improved feeding of the tobacco portions 23 being weighed and separated from the layers 16, and of the portions just separated from the layers 16, the loosening up elements 30 might comprise, for each layer 16, a second upper comb 88 identical to the comb 32, connected to the mechanism 34 which drives the comb 32 and thus movable together with the selfsame comb 32. The combs 88 are positioned in front of the combs 32, in the feed direction of the tobacco layers 16, by a stretch approximately equal in length to the length of the tobacco portions 23, and their purpose is that of pushing onto the conveyor belts 36, at each machine cycle, the tobacco portions 23 which were separated from the tobacco layers 16 during the preceding machine cycle.

Similarly, the conveyor belts 37 associated with the weighing devices 38 might be substituted for trays (not illustrated and similar to the trays 87) on which the tobacco portions 23 can move. The forward movement of the tobacco portions 23 on these trays might be imparted by combs (not illustrated) similar in form and drive mode to the combs 88.

What is claimed is:

1. A method for producing bags containing fiber material, comprising:

forming portions of fiber material and moving them along a predetermined path;

feeding each portion of fiber material into respective containment bags; and moving in succession the bags housing respective portions of fiber material to a folding unit at which the bags are closed;

wherein an ordered succession of bags for containing respective portions of fiber material is obtained from a web unwound continuously from a reel and fed, in order, to a folding section, to a sealing device and to a cutting station; a first temporary accumulation device of a portion of the web being provided for allowing the transit with intermittent motion of the web to the sealing device, and a second temporary accumulation device of a portion of the web being provided between the sealing device and the cutting station for allowing the transit with continuous motion of the web through the cutting station, wherein each of the first and second temporary accumulation devices comprises a pneumatic buffer through which the web sasses, each pneumatic buffer comprising a box-shaped element through which a loop of the web passes, an interior of each pneumatic buffer maintained at a pressure below atmospheric pressure to allow feeding the web stepwise to the sealing device by releasing periodically variable quantities of the web.

2. A machine for producing bags containing fiber material, comprising:

at least one device configured for forming portions of fiber material and configured for feeding fiber material and moving them along a predetermined path;

a first conveyor for transferring the portions of fiber material inside respective containment bags;

a second conveyor for moving in succession the bags housing respective portions of fiber material to a folding unit at which the bags are closed, an unwinding and feeding mechanism configured to unwind a web from a reel continuously and feed the web, in order, to a folding section, to a sealing device and to a cutting station, for forming an ordered succession of bags for containing respective portions of fiber material;

a first temporary accumulation device of a portion of web being provided for allowing the transit with intermittent motion of the web to the sealing device, and a second temporary accumulation device of a portion of web being provided between the sealing device and the cutting station for allowing the transit with continuous motion of the web through the cutting station, wherein each of the first and second temporary accumulation devices comprises a pneumatic buffer through which the web passes, each pneumatic buffer comprising a box-shaped element through which a loop of the web passes, an interior of each pneumatic buffer maintained at a pressure below atmospheric pressure to allow feeding the web stepwise to the sealing device by releasing periodically variable quantities of the web.

* * * * *